Dec. 28, 1948.　　　　R. B. TEMPLE　　　　2,457,416
WHEEL AND BRAKE DRUM ORGANIZATION
Filed Sept. 18, 1947
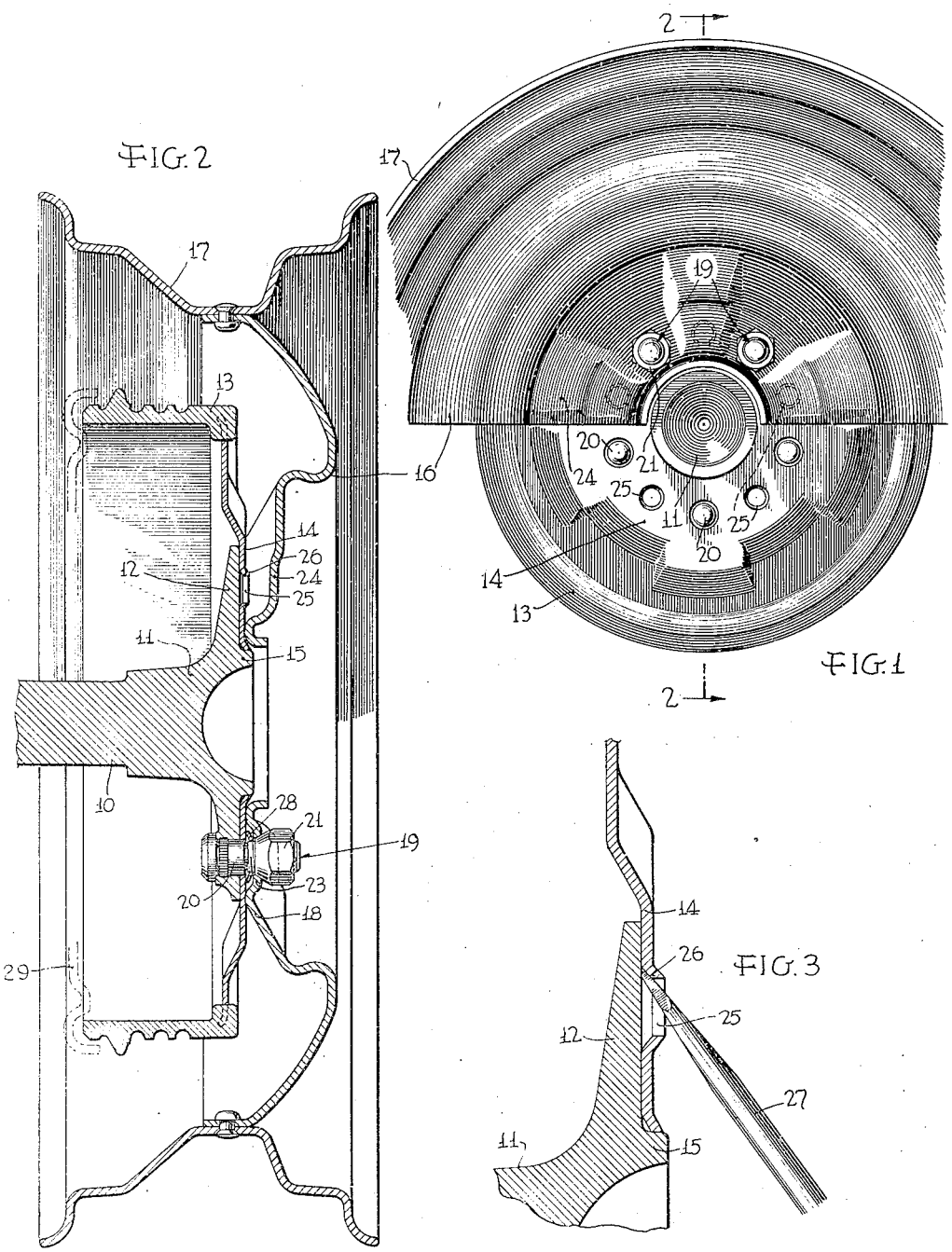
INVENTOR
Robert B. Temple
BY Maurice A. Crews
ATTORNEY Patented Dec. 28, 1948

2,457,416

UNITED STATES PATENT OFFICE 2,457,416

WHEEL AND BRAKE DRUM ORGANIZATION

Robert B. Temple, Grosse Pointe, Mich., assignor to The Budd Company, Philadelphia, Pa., a corporation of Pennsylvania Application September 18, 1947, Serial No. 774,801

3 Claims. (Cl. 301—6)

The invention relates to wheels and, more particularly, to wheels equipped with brake drums.

The invention is particularly concerned with a wheel and drum organization in which both the drum and the wheel are secured outboard of a radial hub flange so as to be readily demountable therefrom in succession. In such an organization, the wheel and drum may be secured to the hub flange by a single set of securing means. The drum, being inboard of the wheel, has its mounting portion seated flatly against a similar flat face of the hub flange and, due to corrosion and otherwise, it may furnish strong resistance against removal even after the securing means have been released.

It is an object of the invention to provide a wheel and drum of this class, which can be readily manufactured at low cost, and in which the assembly and disassembly of the wheel is greatly facilitated.

Other and further objects and advantages and the manner in which they are attained will become evident from the following detailed description when read in connection with the drawings forming a part of this specification.

In the drawings:

Figure 1 is a fragmentary elevational view of a wheel according to the invention, the bottom half of the view having the wheel body broken away to bring the brake drum in elevation;

Figure 2 is an axial cross sectional view on an enlarged scale, showing the complete wheel, exclusive of the pneumatic tire, the section being taken substantially along the line 2—2 of Figure 1; and Figure 3 is an enlarged detail sectional view showing the manner in which a prying tool is applied to pry the brake drum off the hub.

In the drawings, the invention has been shown applied to a rear axle shaft 10 in which the wheel hub 11 is integral with the end of the shaft and is provided with a radial bolting-on flange 12.

With such an integral shaft and hub arrangement, the necessity for removal of the brake drum to make the bearing cap accessible when it is desired to remove the shaft from the axle housing, makes it very desirable to be able to remove the brake drum with dispatch. With the ordinary brake drum having a mounting portion seated flatly against the hub flange, difficulty is experienced in breaking the brake drum free from the hub when its removal is desirable for such servicing.

The brake drum may be of the composite type having cast drum portion 13 and sheet metal head 14 providing the mounting portion for the drum. The mounting portion of the drum has a central opening, the periphery of which is seated on a short outboard extension 15 of the hub barrel beyond the bolting-on flange 12. When the drum is mounted on the hub, its radially extending mounting portion seats flatwise against the flat outboard face of the hub flange, see Figure 2.

The wheel body in this embodiment, represented as a dished disc 16 mounting a rim 17 adapted to receive a pneumatic tire, has a generally radially extending mounting portion 18 which in turn seats against the outboard face of the drum head 14.

A single annular series of securing means 19 may secure the hub flange, drum head and wheel body together. As shown, such securing means comprises a series of screw-threaded studs 20 and nuts 21, the nuts being tapered and engaging tapered seats on the wheel body mounting portion. It will be understood that the securing studs extend through aligned holes provided in the hub flange, drum head and wheel body, and that the parts are firmly but demountably clamped together by the tightening of the nuts 21 on the studs 20.

As shown in Figure 2, the mounting portion of the wheel body is formed with pressed-out portions 23 in the region of the securing means, which space the wheel body from the mounting portion of the brake drum and provide flexibility in this region, giving a spring washer action for the locking of the securing nuts against accidental loosening. Between the securing nuts and studs, the mounting portion of the wheel body may be formed with radially extending rib-like pressed-out portions 24 for stiffening and strengthening the wheel body in this inner, highly stressed region. These pressed-out ribs space the mounting portion from the hub flange in the region between adjacent studs, which space becomes useful to accommodate the drum prying-off means now to be described.

This means may comprise pry holes 25 in the mounting portion of the drum located intermediate the securing holes, and in the form shown, one such pry hole is located between each adjacent pair of securing holes, but it will be understood that a lesser number would, in some cases, suffice.

The marginal portion 26 surrounding each pry hole may be pressed-out so as to be offset from the plane of the main body of the mounting portion of the drum. As shown, it has the form of a frustum of a cone. With this arrangement, after the wheel body has been dismounted by the release of the nuts, if it is desired to remove the brake drum also, this is readily achieved by inserting a suitable tool, as the screw driver 27, see Figure 3, into the pry hole with its edge extending under the offset marginal portion 26 surrounding said hole, and then, by a lever action, prying the brake drum head away from the hub flange.

In mounting the brake drum on the hub, it may be desirable to provide auxiliary holding means to hold the drum in place until the wheel is secured, after which the wheel securing nuts and studs also secure the brake drum to the hub flange. Such auxiliary holding means may comprise a light, thin, sheet metal nut, as 28 (see Figure 2), associated with one or more of the screw threaded studs. Such nuts fit loosely in the space formed by the pressed-out portions 23 surrounding the bolt holes of the wheel body mounting portion and do not interfere with the flexing of these parts under the bolting-on pressure.

The pressed-out marginal portions 26 surrounding the pry holes, being located opposite the pressed-out ribs 24 of the wheel body, are readily received in the space provided by these ribs between them and the hub flange.

A backing plate, as 29, indicated in dot-and-dash lines in Figure 2, closes the inner side of the drum and makes access to the outer periphery of the drum for removing it difficult, if not impossible. The pry-off holes avoid this difficulty.

From the foregoing description, it will be seen that a very simple means has been provided for insuring the easy removal of the drum from the hub and one which does not materially affect manufacturing costs.

While a specific embodiment of the invention has been described herein in detail, it will be understood that changes and modifications may be made by those skilled in the art without departing from the main features of the invention, and such changes and modifications are intended to be covered in the appended claims.

What is claimed is:

1. In a wheel, a hub having a radial flange, a brake drum having a mounting portion seated against the outboard face of said flange, a wheel body having a mounting portion seated against the outboard face of the mounting portion of said drum, and an annular series of bolting-on means extending through aligned holes in said hub flange, drum mounting portion and wheel body mounting portion for securing said parts together, the mounting portion of said drum being formed, intermediate at least some of its securing holes, with pry holes whose margins are offset outwardly of the plane of the main body of said drum mounting portion and the mounting portion of the wheel body being outwardly offset in the region of said pry holes to freely receive the offset margins thereof, said pry holes permitting the insertion of a prying tool for prying the brake drum off the hub flange after the bolting-on means have been released and the wheel body removed.

2. In a wheel, a hub having a radial flange, a brake drum having a head seated against the outboard face of said flange, a wheel body seated against the outboard face of said head, and an annular series of securing bolts extending through aligned holes in said hub flange, drum head and wheel body for securing said parts together, the drum head being formed, intermediate at least some of the securing holes therein, with pry holes having generally frustro-conical margins spaced from the outboard face of the hub flange to permit inserting a prying tool for prying the brake drum off the hub flange after the securing bolts have been released and the wheel body removed.

3. A brake drum having a mounting portion for seating against an outboard face of a radial hub flange, and an annular series of securing holes in said mounting portion for receiving bolting-on means for securing the brake drum to a hub flange, the mounting portion of said drum being formed, intermediate at least some of said mounting holes, with pry holes having marginal portions offset axially outwardly so as to leave a space between said marginal portions and the outboard face of a hub flange on which the drum is adapted to be mounted, whereby, when the drum is seated on said flange and after the bolting-on means are released, a prying tool may be inserted to pry the drum off said flange.

ROBERT B. TEMPLE.

No references cited.